(12) United States Patent
Shimura et al.

(10) Patent No.: US 10,177,702 B2
(45) Date of Patent: Jan. 8, 2019

(54) CONDUCTION NOISE FILTERING CIRCUIT, INVERTING DEVICE, AND COMPRESSOR

(71) Applicant: SAMSUNG ELECTRONICS CO., LTD., Suwon-si, Gyeonggi-do (KR)

(72) Inventors: Tatsuhisa Shimura, Yokohama (JP); Seisaku Oosako, Yokohama (JP); Yasuyuki Yamada, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/216,355

(22) Filed: Jul. 21, 2016

(65) Prior Publication Data

US 2017/0047881 A1 Feb. 16, 2017

(30) Foreign Application Priority Data

Aug. 12, 2015 (JP) .................................. 2015-159672
Feb. 11, 2016 (KR) ........................ 10-2016-0015430

(51) Int. Cl.
| | |
|---|---|
| *H02P 29/50* | (2016.01) |
| *H02P 27/08* | (2006.01) |
| *H02M 5/458* | (2006.01) |
| *H02M 1/44* | (2007.01) |
| *F04B 35/04* | (2006.01) |

(Continued)

(52) U.S. Cl.
CPC ............. *H02P 29/50* (2016.02); *F04B 35/04* (2013.01); *F04B 49/065* (2013.01); *F04C 28/00* (2013.01); *H02M 1/44* (2013.01); *H02M 5/458* (2013.01); *H02M 5/4585* (2013.01); *H02P 27/08* (2013.01); *F04B 2203/0211* (2013.01);

(Continued)

(58) Field of Classification Search
USPC ......................... 318/400.25, 400.23, 400.24
See application file for complete search history.

(56) References Cited

U.S. PATENT DOCUMENTS 6,208,098 B1 3/2001 Kume et al.
6,377,479 B1 4/2002 Ayano et al.
(Continued)

FOREIGN PATENT DOCUMENTS

EP 0 809 346 B1 8/2001
EP 1 220 432 A2 7/2002
(Continued)

OTHER PUBLICATIONS

"Modeling of Conduction EMI Noise and Technology for Noise Reduction", Fuji Electric Review, vol. 81 No. 6, 2008, pp. 443 (63)-443 (67).

(Continued)

*Primary Examiner* — Jorge L Carrasquillo
(74) *Attorney, Agent, or Firm* — Staas & Halsey LLP

(57) ABSTRACT

A conduction noise filtering circuit configured to inhibit conduction noise is provided. The conduction noise filtering circuit includes a first coil part configured to be supplied with alternating current (AC) power, a second coil part configured to be connected to the first coil part in series, a detector configured to detect common mode noise from at least one selected from the first coil part and the second coil part, and a capacitor configured to supply a current offsetting common mode noise between power lines connecting the first coil part and the second coil part in series.

12 Claims, 11 Drawing Sheets

(51) Int. Cl.
  *F04C 28/00* (2006.01)
  *F04B 49/06* (2006.01)
  *H02M 1/12* (2006.01)
(52) U.S. Cl.
  CPC .... *F04C 2240/403* (2013.01); *F04C 2270/13* (2013.01); *H02M 2001/123* (2013.01)

(56) References Cited

U.S. PATENT DOCUMENTS

| | | | |
|---|---|---|---|
| 6,459,597 | B1 | 10/2002 | Igarashi et al. |
| 7,606,052 | B2 | 10/2009 | Akagi |
| 8,649,193 | B2 | 2/2014 | Sakai et al. |
| 2004/0008527 | A1 | 1/2004 | Honda |
| 2011/0317455 | A1* | 12/2011 | Azuma ................. H02M 7/48 363/37 |
| 2013/0147419 | A1 | 6/2013 | Sakai et al. |
| 2014/0167499 | A1 | 6/2014 | Schwager et al. |

FOREIGN PATENT DOCUMENTS

| | | | |
|---|---|---|---|
| JP | 10-42585 | | 2/1998 |
| JP | 2000-201044 | | 7/2000 |
| JP | 2006-333647 | | 12/2006 |
| JP | 2010-57268 | | 3/2010 |
| JP | 2010057268 | A * | 3/2010 |
| JP | 2013-158085 | | 8/2013 |
| JP | 2013158085 | A * | 8/2013 |
| JP | 5621533 | | 11/2014 |

OTHER PUBLICATIONS

Chen et al., "Modeling of Conduction EMI Noise and Technology for Noise Reduction", Fuji Electric Review, vol. 55 No. 2, May 20, 2009, pp. 64-68.

* cited by examiner

CONDUCTION NOISE FILTERING CIRCUIT, INVERTING DEVICE, AND COMPRESSOR

CROSS-REFERENCE TO RELATED APPLICATIONS

This application claims priority from Japanese Patent Application No. 2015-159672, filed on Aug. 12, 2015, in the Japan Patent Office, and Korean Patent Application No. 10-2016-0015430, filed on Feb. 11, 2016, in the Korean Intellectual Property Office, the disclosure of which is incorporated herein by reference in its entirety.

BACKGROUND OF THE INVENTION

Field of the Invention

Apparatuses and methods consistent with the present invention relate to a conduction noise filtering circuit, an inverting device, and a compressor, and more particularly, to a conduction noise filtering circuit that improves an inhibition performance of conduction noise, an inverting device including the same, and a compressor.

Description of the Related Art

A modern trend toward the development of technologies that make electrical or electronic devices small, light, high-speed, low-power, etc. has enabled the electrical or electronic devices to be more precisely made. Therefore, the electrical or electronic devices are vulnerable to external obstacles. As a result, when designing devices, developers devise means for inhibiting tolerances and noise to external electromagnetic interferences from being generated.

For example, an inverting device used to control a motor, etc. includes a rectifier that converts a commercial alternating current (AC) voltage into a direct current (DC) voltage through a diode bridge, a switching element, or the like. The inverting device also includes an inverter that converts the converted DC voltage into an AC voltage through the switching element.

The inverting device generates conduction noise, which affects another electronic device through a power line, due to a switching operation of the switching element. Conduction noise that is a kind of Electromagnetic Interference (EMI) noise includes normal mode noise (also referred to as differential mode noise) that shuttles between power lines and common mode noise that conducts electricity between power lines and ground (earth).

An existing conduction noise inhibiting circuit or filter does not sufficiently respond to conduction noise flowing on a power line and does not sufficiently perform a feedback control for attenuating noise. In other words, a level of conduction noise is regulated according to standards of Commite Internationale Special des Perturbations Radioeletriques (CISPR). Therefore, the conduction noise needs to be inhibited to be lower than or equal to an allowable value, but this is not sufficiently achieved.

SUMMARY OF THE INVENTION

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a conduction noise filtering circuit that improves an inhibition performance of conduction noise, an inverting device including the same, and a compressor.

According to an aspect of the present invention, a conduction noise filtering circuit includes a first coil part configured to be supplied with alternating current (AC) power, a second coil part configured to be disposed between the first coil part and an output terminal, a detector configured to detect common mode noise flowing on at least one selected from the first coil part and the second coil part, and a capacitor configured to supply offset power offsetting the detected common mode noise to a connection terminal to which the first coil part and the second coil part are connected in common.

A first coil of the first coil part and a second coil of the second coil part may be wound on a core.

The first coil part may include a plurality of first coils configured to be individually supplied with phases of the AC power.

The second coil part may include a plurality of second coils configured to be respectively connected to the plurality of first coils in series.

The detector may include a first detection coil configured to be magnetically coupled to at least one first coil of the first coil part.

The detector may further include a second detection coil configured to be connected to the first detection coil and to be magnetically coupled to at least one second coil of the second coil part.

The conduction noise filtering circuit may further include an amplifier configured to amplify an output signal of the detector and provide the amplified signal to the capacitor.

The amplifier may be a current amplifier.

According to another aspect of the present invention, an inverting device includes a rectifier configured to rectify an AC into a direct current (DC), a smoothing unit configured to smooth the rectified DC, an inverter configured to convert the smoothed DC into an AC through switching operations of a plurality of switching transistors, and an inhibitor configured to transmit an AC input from a power source to the rectifier or transmit the converted AC input from the inverter to a load. The inhibitor may include a plurality of coils configured to be supplied with the input AC and to be connected to one another in series and supply offset power offsetting common mode noise to a connection terminal through which the plurality of coils are connected to one another in series, by using a signal detecting the common mode noise from at least one of the plurality of coils.

According to another aspect of the present invention, a compressor configured to compress a refrigerant, includes a motor configured to supply power for compressing the refrigerant, and an inverting device configured to convert supplied AC power into rectification power for driving the motor. The inverting device may include a plurality of coils configured to be supplied with the AC power and to be connected to one another in series, detect common mode noise flowing on at least one of the plurality of coils, and supply offset power offsetting the common mode noise to a connection terminal through which the plurality of coils are connected to one another in series, by using a signal detecting the common mode noise.

A conduction noise filtering circuit according to various exemplary embodiments of the present invention may achieve effects as follows.

According to an exemplary embodiment of the present invention, a conduction noise filtering circuit that sufficiently inhibits conduction noise may be provided.

According to another exemplary embodiment of the present invention, a signal that detects common mode noise may become greater, and thus an inducing performance and a tracking performance may be high.

According to another exemplary embodiment of the present invention, a plurality of coils may be wound on one core, and thus the conduction noise filtering circuit may be made small.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
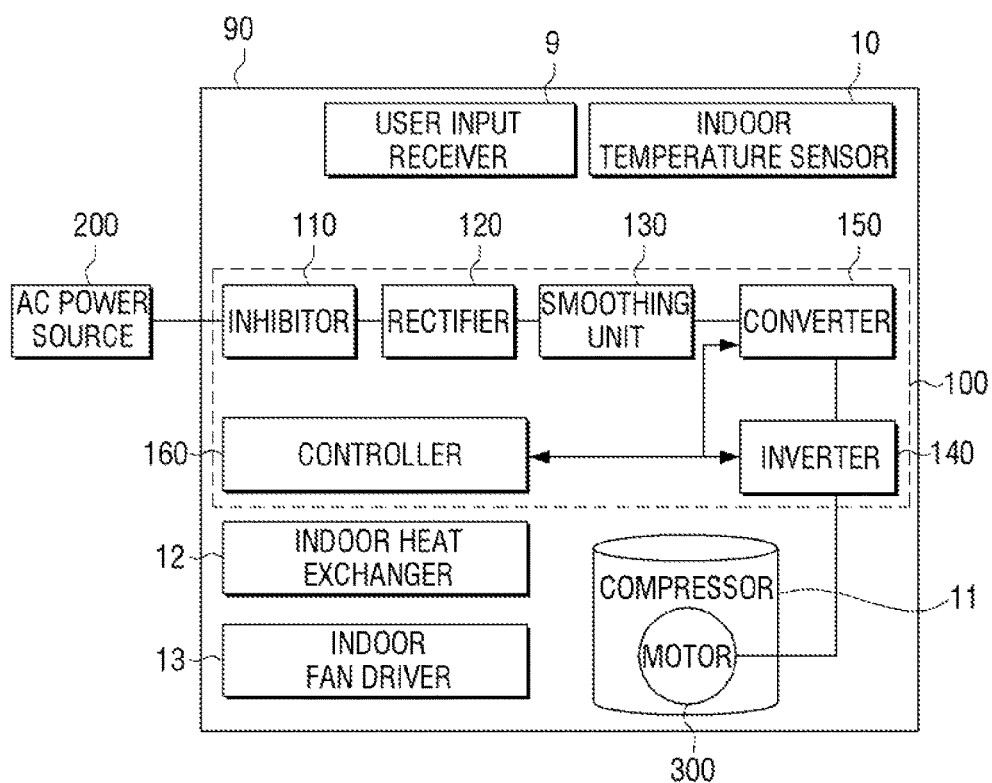
FIG. 1 is a block diagram of a configuration of an air conditioner to which an inverting device is applied, according to an exemplary embodiment of the present invention.

The following description with reference to one or more exemplary embodiments and methods of accomplishing the same, examples of which the accompanying drawings are provided to assist in a comprehensive understanding. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, and are used to enable a clear and consistent understanding of the present disclosure. Accordingly, it may be apparent to those skilled in the art that the following description of various embodiments are provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments of the present disclosure. However, various embodiments of the present disclosure can be practiced without those specifically defined matters. Also, well-known functions or constructions are not described in detail since they would obscure the application with unnecessary detail.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. In addition, 'and/or' may include any one of or a combination of the components mentioned.

In addition, a singular form may include a plural from as long as it is not specifically mentioned in a sentence. In addition, "include/comprise" or "including/comprising" used in the specification represent that one or more components, operations, and elements exist or are added.

In the embodiments of the present disclosure, a 'module' or 'unit' performs at least one function or operation, and may be realized as hardware or software, or a combination thereof. In addition, a plurality of 'modules' or a plurality of 'units' may be integrated into at least one module and be realized as at least one processor (not illustrated) except for when they need to be realized as a certain hardware. They may be realized as a central processing unit (CPU) and an associated storage memory.

FIG. 1 is a block diagram of a configuration of an air conditioner 90 to which an inverting device 100 is applied, according to an exemplary embodiment of the present invention.

Referring to FIG. 1, the air conditioner 90 includes the inverting device 100, a user input receiver 9, an indoor temperature sensor 10, a compressor 11, an indoor heat exchanger 12, and an indoor fan driver 13.

The air conditioner 90 receives alternating current (AC) power from an AC power source 200. For example, the AC power source 200 may supply the air conditioner 90 with a commercial AC signal that is supplied to a home.

The inverting device 100 supplies power for driving the compressor 11. In detail, the inverting device 100 may supply electric power to a motor 300 of the compressor 11 so as to enable the motor 300 to generate power for compressing a refrigerant.

The inverting device 100 includes an inhibitor 110, a rectifier 120, a smoothing unit 130, an inverter 140, a converter 150, and a controller 160. The inverting device 100 will be described in detail later with reference to FIG. 2.

The inverting device 100 may also convert the AC power, which is supplied from the AC power source 200, into rated power for driving the compressor 11 such as the motor 300 or the like. A frequency, an intensity, a phase, etc. of the rated power may be changed to control a motion of the motor 300.

The user input receiver 9 receives a command that enables a user to operate the air conditioner 90. In detail, the user input receiver 9 may receive a power turning input, a timer input, and a desired temperature control input. Also, the user input receiver 9 may include a physical button or may receive a command signal from a remote control device using infrared rays.

The indoor temperature sensor 10 senses an indoor temperature. Indoor temperature information of a temperature sensor of the indoor temperature sensor 10 may be used as an input of a control for keeping a constant temperature.

The compressor 11 compresses the refrigerant. In detail, the compressor 11 may suck the refrigerant that is at a high temperature and a low pressure and corresponds to an indoor temperature, compress the refrigerant at a high temperature and a low pressure, and discharge the compressed refrigerant to an outdoor unit.

The motor 300 of the compressor 11 generates power. In detail, the motor 300 may generate power for compressing the refrigerant by converting supplied electric energy into dynamic energy. For example, the motor 300 may generate rotation power, transfer the rotation power to a piston, and compress the refrigerant sucked in a cylinder due to a motion of the piston. In the exemplary embodiment of FIG. 1, the motor 300 of the compressor 11 is a load of the inverting device 100.

The indoor heat exchanger 12 absorbs indoor heat. In detail, the refrigerant at the low temperature may expand by absorbing indoor heat from the indoor heat exchanger 12.

The indoor fan driver 13 enables indoor air to pass through the indoor heat exchanger 12 along a flow path of air. In detail, the indoor fan driver 13 may form wind by driving a fan and enable the indoor air to be deprived of heat through the indoor heat exchanger 12.

The inverting device 100 according to the present invention has been described as being used to supply power to the motor 300 of the air conditioner 90 but is not limited thereto. The inverting device 100 may be used to supply power to the motor 300 used in a compressor of a refrigerator.

Hereinafter, the motor 300 will be described as a load of the inverting device 100. However, the load is not limited thereto and may be another device other than the motor 300.

Figure 2:
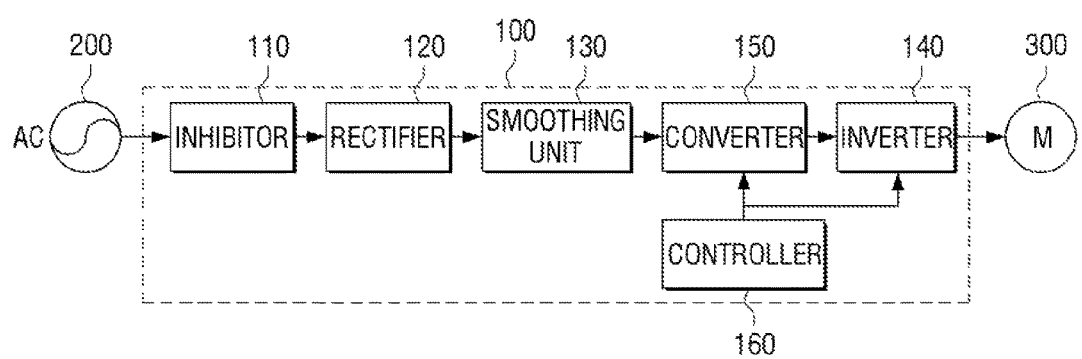
FIG. 2 is a block diagram of a detailed configuration of the inverting device of FIG. 1.

FIG. 2 is a block diagram of a detailed configuration of the inverting device 100 of FIG. 1.

Referring to FIG. 2, the inverting device 100 includes the inhibitor 110, the rectifier 120, the smoothing unit 130, the inverter 140, the converter 150, and the controller 160.

The inhibitor 110 inhibits conduction noise. In detail, the inhibitor 110 may inhibit conduction noise (or a current) flowing along a plurality of power lines for supplying power to the load, i.e., the motor 300. The inhibitor 110 may be referred to as a filter in terms of removing a noise component of the current. The inhibitor 110 will be described in detail later with reference to FIG. 3.

The rectifier 120 rectifies an AC supplied from the AC power source 200 into a DC. The rectifier 120 may be a half-wave or all-wave rectifier. The rectifier 120 may include a plurality of switches or a plurality of diodes.

The smoothing unit 130 smoothes the rectified DC output from the rectifier 120. The smoothing unit 130 may include a smoothing capacitor that delays variations in a voltage and/or current with respect to time.

The converter 150 converts an input DC voltage into a target voltage. In detail, the converter 150 may convert an intensity of the rectified DC voltage through a converting operation. For example, the converter 150 may step up or down an intensity of the input DC voltage as an operating voltage of the load. The converter 150 may include a plurality of switching elements controlled by the controller 160. The converter 150 may be realized as a bidirectional buck-boost converter or a half-bridge or full-bridge converter using a transformer.

The inverter 140 converts a transformed DC into an AC and supplies the AC to the motor 300. In detail, the inverter 140 may convert the transformed DC into the AC through an inverting operation. For example, the inverter 140 may convert the input DC into a three-phase AC having an operating frequency of the load.

The controller 160 controls the converter 150 and the inverter 140. In detail, the controller 160 may output a signal for controlling the switching elements of the converter 150 so as to convert a voltage and output a signal for controlling the switching elements of the inverter 140 so as to invert a DC into an AC. The controller 160 may output a pulse width modulation (PWM) signal for controlling switching operations of the switching elements. The controller 160 may control a timing when a plurality of switching elements are opened and/or closed by adjusting a duty ratio of the PWM signal. This control operation affects power efficiency (or a power factor) and a rotation speed (or a load) for driving the motor 300.

Figure 3:
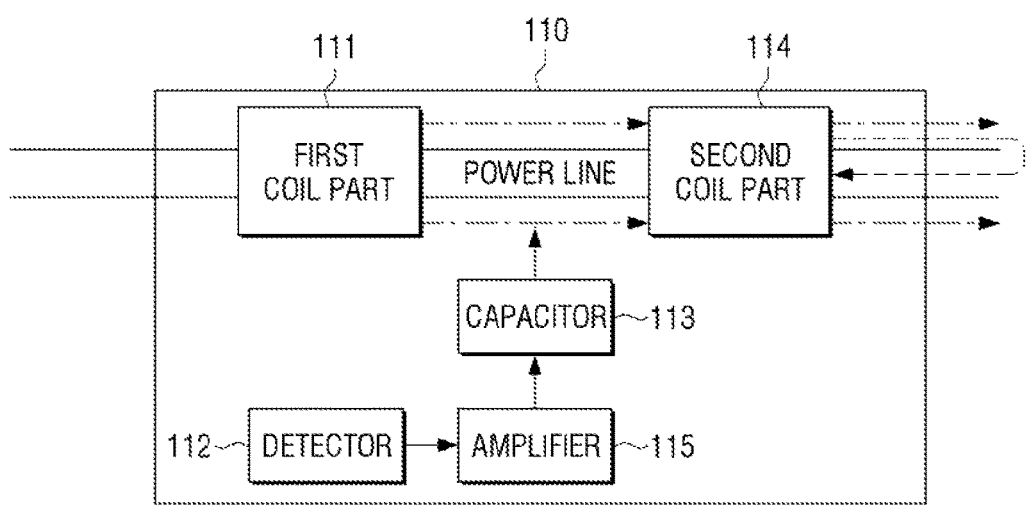
FIG. 3 is a block diagram of a detailed configuration of an inhibitor of FIG. 2.

FIG. 3 is a block diagram of a detailed configuration of the inhibitor 110 of FIG. 2.

Conduction noise will be first described. Referring to FIG. 3, the conduction noise is divided into normal mode noise (marked with a long broken line) that shuttles between power lines and common mode noise (marked with a broken line and a dotted line) where a current flows toward the same direction along the power lines.

The inhibitor 110 includes a first coil part 111, a detector 112, a capacitor 113, a second coil part 114, and an amplifier 115.

The first coil part 111 is supplied with AC power. The second coil part 114 is disposed between the first coil part 111 and an output terminal. The first coil part 111 and the second coil part 114 include a plurality of coils having impedances acting as resistances for an AC. The first coil part 111 and the second coil part 114 are connected to each other in series.

Here, the normal mode noise shuttles in opposite directions through the first coil part 111 and the second coil part 114 and thus are offset by each other to disappear.

However, since the common mode noise flows in one direction toward ground along the power lines, an Electromagnetic Interference (EMI) signal generated by a current is radiated into the air or short-circuits on an unexpected path. Although noise that is radiated or short-circuits and then is transferred to another device has a very small amplitude, the noise may fatally affect the another device.

The detector 112 detects the common mode noise from at least one of the first coil part 111 and the second coil part 114. In an exemplary embodiment, the detector 112 includes a detection coil that is magnetically coupled to a first coil of the first coil part 111. The detection coil outputs a detection signal corresponding to the common mode noise passing through the first coil part 111. In another exemplary embodiment, the detector 112 may include a plurality of detection coils and a second detection coil that is magnetically coupled to the first coil and the second coil part 114. Here, a first detection coil and the second detection coil are connected to each other in series.

The amplifier 115 amplifies a signal corresponding to the common mode noise detected by the detector 112. The amplified output signal is provided to a connection terminal, which connects the first coil part 111 and the second coil part 114, through the capacitor 113. A feedback offset current that flows at a common node of the first and second coils connected to each other in series offsets the common mode noise.

Hereinafter, elements of the inverting device 100 of various exemplary embodiments applicable to the exemplary embodiments of FIGS. 1 through 4 will be described in more detail. However, the converter 150 and the controller 160 are omitted hereinafter.

Figure 4:
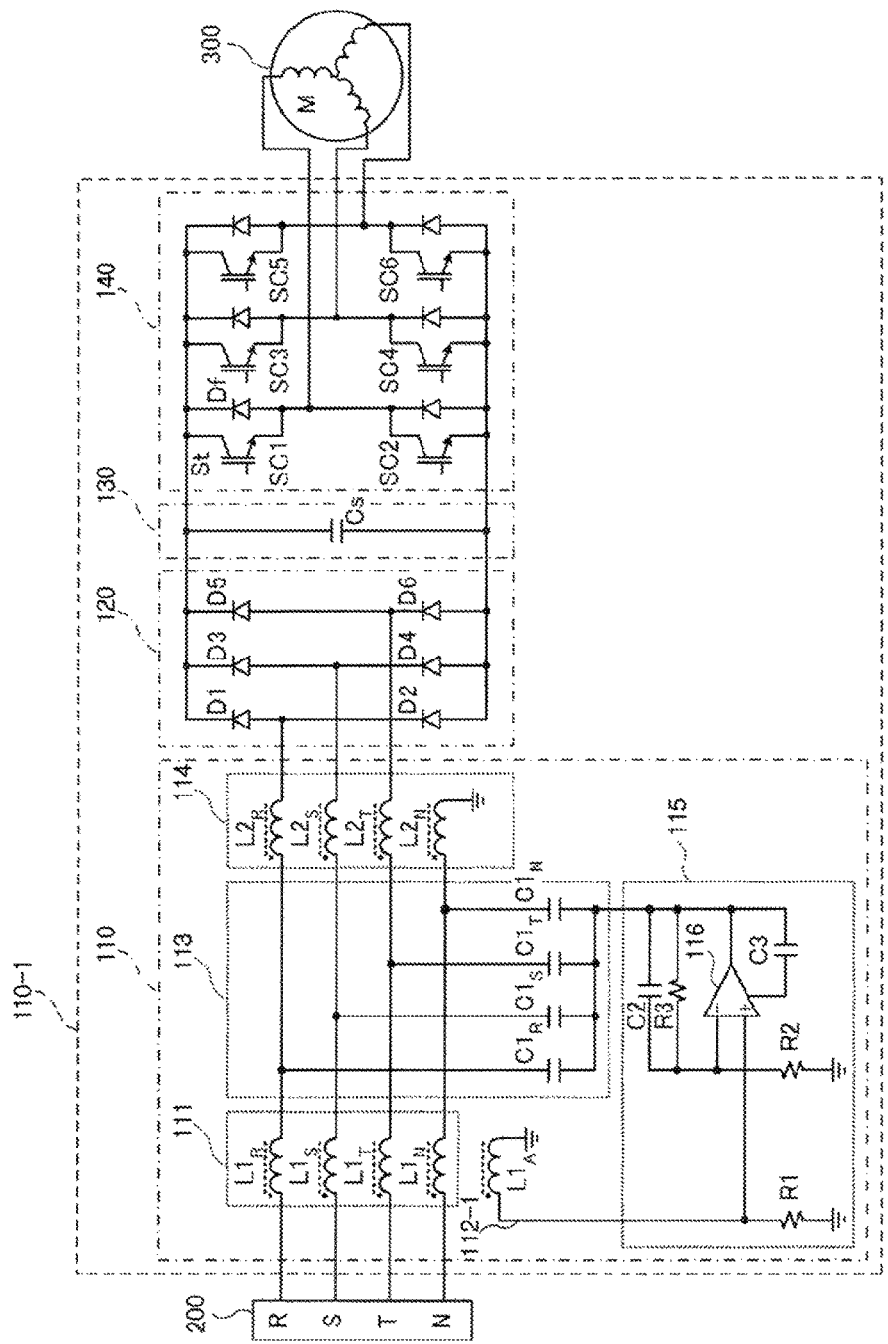
FIG. 4 is a circuit diagram of an inverting device according to an exemplary embodiment of the present invention.

FIG. 4 is a circuit diagram of an inverting device 100-1 according to an exemplary embodiment of the present invention. In the exemplary embodiment of FIG. 4, the inverting device 100-1 is supplied an AC from the AC power source 200 having a three-phase four-wire system and including a neutral phase (N phase). Here, first, second, and third phases are respectively referred to as R, S, and T phases. Power lines that supplies, R, S, T, and N phases from the AC power source 200 are respectively referred to as power lines of the R, S, T, and N phases. Hereinafter, if phases does not need to be distinguished from one another in the following description, the power lines are referred to as a power line. Also, as will be described later, a common node to which the first coil part 111 and the second coil part 114 are connected to each other in series will be equally referred to as a power line.

Here, as illustrated herein, the inverting device 100-1 is connected to the motor 300 that is controlled as a load by a three-phase AC. For example, the motor 300 may be a DC brushless motor or a three-phase AC motor.

Referring to FIG. 4, the inverting device 100-1 includes the inhibitor 110, the rectifier 120, the smoothing unit 130, and the inverter 140.

The inhibitor 110 inhibits conduction noise. The rectifier 120 rectifies an AC supplied from the AC power source 200 into a DC. The smoothing unit 130 smoothes the DC output from the rectifier 120. Also, the inverter 140 converts the smoothed DC into a three-phase AC and supplies the three-phase AC to the motor 300. Repeated descriptions of elements of the inverting device 100-1 of FIG. 4 are omitted.

Also, as shown in FIG. 4, nodes of some of elements are grounded.

Elements of the inverting device 100-1 are connected to one another in order of the inhibitor 110, the rectifier 120, the smoothing unit 130, and the inverter 140 from the AC power source 200. Also, the motor 300 is connected to the inverter 140.

The inhibitor 110 inhibits conduction noise. The inhibitor 110 will be described in more detail later.

The rectifier 120 includes a diode bridge including six rectification diodes D1 through D6. The six rectification diodes D1 through D6 rectify the AC supplied from the AC power source 200 into a DC. When the six rectification diodes D1 through D6 are not distinguished from one another, the six rectification diodes D1 through D6 are referred to as a rectification diode D.

The smoothing unit 130 includes a smoothing capacitor Cs. The smoothing capacitor Cs is connected between a wire (or an upper wire of FIG. 1) of a high voltage of the DC rectified by the rectifier 120 and a wire (or a lower wire of FIG. 1) of a reference voltage.

The inverter 140 includes six switching circuits SC1 through SC6 each having a switching transistor St and a feedback diode Df Hereinafter, when the six switching circuits SC1 through SC6 do not need to be distinguished from one another, the six switching circuits SC1 through SC6 are referred to as a switching circuit SC.

Also, the switching circuit SC1 of an upper arm and the switching circuit SC2 of a lower arm are connected to each other in series, and a connection point between the switching circuits SC1 and SC2 is connected to a node of the motor 300. In addition, the switching circuit SC1 of the upper arm and the switching circuit SC2 of the lower arm that are connected to each other in series are provided between the wire of the high voltage and the wire of the reference voltage. The other switching circuits SC3 through SC6 operate equally like the switching circuits SC1 and SC2 are connected to each other in series.

The switching transistor St may be realized as a power semiconductor switching transistor such as a Metal Oxide Silicon Field Effect Transistor (MOSFET), an Insulated Gate Bipolar Transistor (IGBT), or a Bipolar Junction Transistor (BJT).

An operation of the inverting device 100-1 according to the present exemplary embodiment will now be described.

The commercial AC power source 200 supplies an AC voltage to the rectifier 120 through the inhibitor 120 that inhibits conduction noise. The rectifier 120 rectifies the AC voltage supplied from the AC power source 200 into a DC voltage through the rectification diodes D1 through D6 that are connected to one another in a bridge shape. The smoothing unit 130 smoothes a pulsation of the DC voltage rectified by the rectifier 120 through the smoothing capacitor Cs. The inverter 140 supplies the AC voltage to the motor 300 by controlling turning on and/or off of the switching transistor St in the switching circuit SC.

Hereinafter, the inhibitor 110 will be described in more detail. The inhibitor 110 is an active type conduction noise filtering circuit that detects, feeds back, and inhibits common mode noise. Also, as to a direction toward which power is supplied, a side of the AC power source 200 is referred to as an upflow direction with respect to the inhibitor 110, and a side of the rectifier 120 is referred to as a downflow direction with respect to the inhibitor 110.

The inhibitor 110 includes the first coil part 111, a detection coil L1A 112-1, the capacitor 113, the second coil part 114, and the amplifier 115. The above-mentioned elements are connected to one another in order of the first coil part 111, the capacitor 113, and the second coil part 114 from the AC power source 200. Also, the first coil part 111 is connected to the AC power source 200, and the second coil part 114 is connected to the rectifier 120. The detection coil L1A 112-1 is provided to be magnetically coupled to the first coil part 111.

The first coil part 111 includes coils (or wires) L1R, L1S, L1T, and L1N that are connected to one another in series on power lines of the R, S, T, and N phases. Hereinafter, when the coils L1R, L1S, L1T, and L1N do not need to be distinguished from one another, the coils L1R, L1S, L1t, and L1N will be referred to as a coil L1.

Here, a coil refers to a conducting wire that is wound in a spiral (or loop) shape to form inductance.

The coils L1R, L1S, L1T, and L1N may be formed of a conducting wire (or a wire) that is wound on one core (or referred to as an iron core) and forms parts of the power lines. The core may have a closed loop shape along which a magnetic flux formed by currents of the coils L1R, L1S, L1T, and L1N circulates. For example, the core may be a troidal core that is formed of a magnetic material such as ferrite having a ring shape (or a doughnut shape) having a circular cross-section. The core may also have a polygonal frame shape such as a square shape, a triangular shape, or the like besides the ring shape. Also, a shape of a cross-section of the core may be various shapes such as a square, a triangle, etc.

The coils L1R, L1S, L1T, and L1N are wound on one core so as to be adjacent to one another. Therefore, the coils L1R, L1S, L1T, and L1N are magnetically coupled to one another. Also, the coils L1R, L1S, L1T, and L1N may be wound so as to have the same direction polarities as marked with "●" in FIG. 4.

Also, the detection coil L1A 112-1 is provided to be magnetically coupled to the first coil part 111. For example, the detection coil L1A 112-1 may be wound on one core so as to be adjacent to the coils L1R, L1S, L1T, and UN. As another example, the detection coil L1A 112-1 may be wound on one core so as to be adjacent to the coils L1R, L1S, L1T, and UN or may be wound on one core so as to overlap with the coils L1R, L1S, L1T, and UN. Also, the detection coil L1A 112-1 may be wound so as to have a polarity in a direction marked with "●" FIG. 4.

A terminal of the detection coil L1A 112-1 is grounded. Also, an other terminal of the detection coil L1A 112-1 may be connected to the amplifier 115 that will be described later.

The coils L1R, L1S, L1T, and L1N form parts of the power lines on which a current flows from the AC power source 200. Here, the coils L1R, L1S, L1T, and L1N may be formed of conducting wires (or wires) having thicknesses corresponding to the flowing current.

As will be described later, the detection coil L1A 112-1 detects a current (hereinafter referred to as a common mode current) of common mode noise. Therefore, the detection coil L1A 112-1 may be formed of a conducting wire (or a wire) having a thickness enough to detect the common mode current.

Also, the coils L1R, L1S, L1T, and L1N may each have the same inductance.

The common mode current is a high frequency current that leaks to ground through a stray capacitance of the motor 300 or the like due to switching of the switching transistor St of the inverter 140. The common mode current flows in the same direction on the power lines of the R, S, T, and N phases and the ground (earth).

The coils L1R, L1S, L1T, and L1N that are inductors act as resistors to the common mode current that is a high frequency signal. Therefore, the coils L1R, L1S, L1T, and L1N inhibit (reduce) the common mode noise. However, the command mode noise may not be completely removed from the first coil part 111.

If the common mode current flows on the coils L1R, L1S, L1T, and L1N, a current proportional to the common mode current is induced to the detection coil L1A 112-1 through the core.

In other words, the first coil part 111 and the detection coil L1A 112-1 act as a current transformer and constitute a detection transformer that detects the common mode current.

Also, a normal mode current flows to shuttle in opposite directions between the power lines. Therefore, the coils L1R, L1S, L1T, and UN that are wound on the troidal core function to remove flowing normal mode noise from one another.

The capacitor 113 includes capacitors C1R, C1S, C1T, and C1N. Terminals of the capacitors C1R, C1S, C1T, and C1N are respectively connected to the power lines of the R, S, T, and N phases. Other terminals of the capacitors C1R, C1S, C1T, and C1N are respectively commonly connected to an output terminal of the amplifier 115 that will be described later. In this case, an output (i.e., a current offsetting a current of common mode noise) of an operational amplifier 116 constituting the amplifier 115 is commonly connected to the power lines of the R, S, T, and N phases through the capacitors C1R, C1S, C1T, and C1N. Here, when the capacitors C1R, C1S, C1T, and C1N are not distinguished from one another, the capacitors C1R, C1S, C1T, and C1N are referred to as a capacitor C1.

The capacitors C1R, C1S, C1T, and C1N may have the same capacitance.

The capacitors C1R, C1S, C1T, and C1N are disposed between the power lines of the R, S, T, and N phases. For example, the capacitors C1R and C1S that are connected to each other in series are disposed between the power lines of the R and S phases. Therefore, the capacitors C1R, C1S, C1T, and C1N function to mutually offset normal mode noise flowing on the power lines of the R, S, T, and N phases.

The second coil part 114 includes coils L2R, L2S, L2T, and L2N that are respectively connected to the power lines of the R, S, T, and N phases in series. The coils L2R, L2S, L2T, and L2N are conducting wires (or wires) constituting parts of power lines and are wound on another one core like the structure of the first coil part 111. Therefore, the coils L2R, L2S, L2T, and L2N are magnetically coupled to one another. Also, the coils L2R, L2S, L2T, and L2N are wound to have polarities marked with "●" in FIG. 4. Hereinafter, when the coils L2R, L2S, L2T, and L2N do not need to be distinguished from one another, the coils L2R, L2S, L2T, and L2N are referred to as a coil L2.

The coils L2R, L2S, L2T, and L2N may also have the same inductance.

The coils L2R, L2S, L2T, and L2N that are inductances act as resistors to the common mode current like the first coil part 111. Therefore, the coils L2R, L2S, L2T, and L2N inhibit (reduce) the common mode noise. However, like the first coil part 111, the common mode noise is not all removed from the second coil part 114.

The coils L2R, L2S, L2T, and L2N that are wound on the core function to remove normal mode noise from one another.

The amplifier 115 includes the operational amplifier 116, resistors R1, R2, and R3, and capacitors C2 and C3. The other terminal of the detection coil L1A 112-1 is grounded through the resistor R1.

A terminal of the resistor R1 that is not grounded is connected to a non-inverting input node (which is marked with "+" and thus is referred to as the non-inverting input node +) of the operational amplifier 116.

The capacitor C2 is a feedback capacitor, the resistor R3 is a feedback resistor, and the capacitor C2 and the resistor R3 are connected to each other in series. Also, terminals of the capacitor C2 and the resistor R3 are connected to an inverting input node of the operational amplifier 116 (which is marked with "−" in FIG. 4 and thus is referred to as an inverting input node "−"). Other terminals of the capacitor C2 and the resistor R3 are connected to an output node of the operational amplifier 116. Also, the inverting input node "−" of the operational amplifier 116 is grounded through the resistor R2. Also, the capacitor C3 for adjusting a phase is disposed between the output node of the operational amplifier 116 and a drive power node (not shown) of the operational amplifier 116. The operational amplifier 116 may be realized as a current amplifier.

Hereinafter, a function and an operation of the inhibitor 110 will be described in detail.

The detection coil L1A 112-1 detects common mode noise (a common mode current) from the power lines of the R, S, T, and N phases of the first coil part 111. The operational amplifier 116 of the amplifier 115 amplifies a current generated from the detection coil L1A 112-1 due to the detected common mode current and supplies (or overlays) the amplified current to (or with) the power lines of the R, S, T, and N phases through the capacitor 113. Here, the operational amplifier 116 amplifies a current induced by the common mode current so as to remove (or offset) the common mode noise. Therefore, the common mode noise is inhibited from the power lines of the R, S, T, and N phases.

Also, the capacitors C1R, C1S, C1T, and C1N of the capacitor 113 set currents corresponding to levels of the common mode noise of the power lines of the corresponding R, S, T, and N phases so as to overlap with one another.

As described above, the amplifier 115 amplifies a current corresponding to a sensed common mode current. However, the amplifier 115 may be realized so as to amplify a voltage (or a common mode voltage) into which the common mode current is converted. In other words, the amplifier 115 may be configured so as to receive a voltage and output a current.

As described above, the inhibitor 110 inhibits normal mode noise and common mode noise that are conduction noise.

A function of the second coil part 114 will now be described.

Figure 5A:
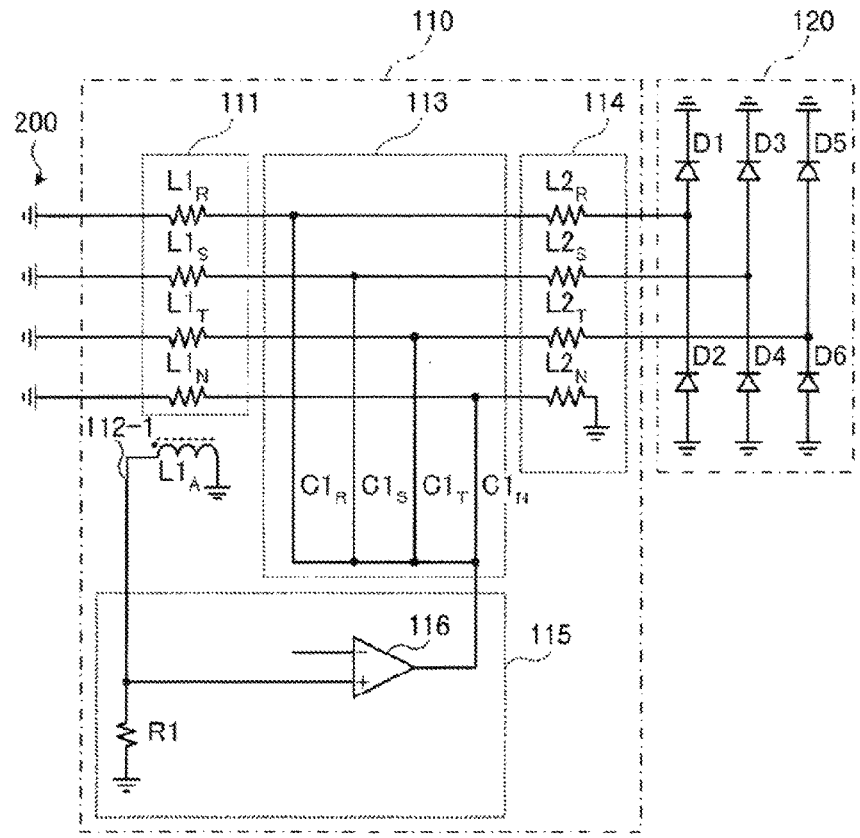
FIGS. 5A and 5B are equivalent circuit diagrams of an inhibitor and a rectifier of the inverting device of FIG. 4 that operates in a frequency band of noise that is to be inhibited.
Figure 5B:
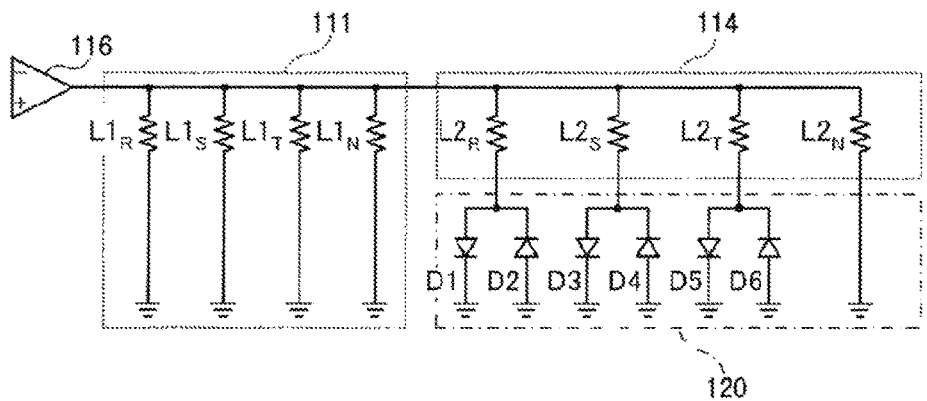

FIGS. 5A and 5B are equivalent circuit diagrams of the inhibitor 110 and the rectifier 120 of the inverting device 100-1 of FIG. 4. FIG. 5A is an AC equivalent circuit corresponding to FIG. 1, and FIG. 5B is an AC equivalent circuit seen from the output node of the operational amplifier 116 of the amplifier 115.

The common mode noise is a high frequency (or an AC) signal. Therefore, coils L1 and L2 alternatingly function as resistors, and the capacitor C1 alternatingly short-circuits. Also, the R, S, T, and N phases of the AC power source 200 alternatingly short-circuit. A rectification diode D of the rectifier 120 alternatingly short-circuits.

Therefore, as shown in FIGS. 5A and 5B, the coils L1 and L2 are marked as symbols of resistors, and the capacitor C1 is marked with a line. Also, the rectification diode D of the rectifier 120 is marked with a symbol of a diode.

As shown in FIG. 5A, the detection coil L1A 112-1 and the resistor R1 are connected to the non-inverting input node "+" of the operational amplifier 116 of the amplifier 115 in parallel. The detection coil L1A 112-1 alternatingly functions as a resistor. Therefore, an impedance of the non-inverting input node "+" of the operational amplifier 116 is formed to be high. Equally, a voltage of a signal corresponding to the common mode current detected by the first coil part 111 is high. Therefore, the voltage corresponding to the common mode current may become easy to be input into the operational amplifier 116, may become easy to follow changes in the common mode current, and may precisely inhibit the common mode noise.

Also, a method of detecting the common mode noise through a plurality of capacitors equal to the capacitor 113 may be considered as a method of detecting the common mode noise. In this case, as shown in FIG. 5A, the first coil part 111 becomes the same element as the capacitor 113. Since a capacitor alternatingly short-circuits, an impedance of the non-inverting input node "+" of the operational amplifier 116 becomes lower, and a voltage corresponding to the common mode current becomes lower. Therefore, the voltage corresponding to the common mode current is difficult to be input into the operational amplifier 116 and is difficult to follow changes in the common mode current.

Therefore, the inhibitor 110 according to the present exemplary embodiment detects the common mode noise (or the common mode current) by using the detection coil L1A 112-1. Due to this, an impedance of the input node (or the non-inverting input node "+") of the operational amplifier 116 may be set to be high.

As shown in FIG. 5B, the output node of the operational amplifier 116 of the amplifier 115 is grounded respectively through the coils L1S, L1T, and L1N of the first coil part 111. The output node of the operational amplifier 116 is also connected to the coils L2R, L2S, and L2T of the second coil part 114 and the rectification diodes D1 through D6 of the rectifier 120 in series to be grounded. Also, the coil L2N is grounded not through the diode D.

Here, the rectification diodes D1 through D6 alternatingly short-circuit. However, the coils L1R, L1S, L1T, and L1N and the coils L2R, L2S, L2T, and L2N alternatingly function as resistors. Therefore, a load of the operational amplifier 116 has a high impedance. As a result, the output node of the operational amplifier 116 may output a current that removes (or offsets) the common mode noise at a high voltage.

For example, an output voltage of the operational amplifier 116 for inhibiting the common mode noise is about ±20 V. Here, an output current is about ±0.3 A.

The output voltage and the output current described above may correspond to each other by using a well-known operational amplifier (Op Amp).

Also, a current or a voltage that removes (or offsets) the common mode noise may be output through an inductor connected to the power lines in series instead of the capacitor C1. Here, if a driver circuit (e.g., a push-pull type transistor circuit) having a low impedance supplies a current to an inductor, an inductance of the inductor may fluctuate, and a current flowing on the power lines may fluctuate.

As a result, in the inhibitor 110 according to the present exemplary embodiment, the coil L1 of the first coil part 1111 that is connected as a load to the operational amplifier 116 and the coil L2 of the second coil part 114 are connected to each other in parallel. Therefore, the amplifier 115 has a load of a high impedance. Therefore, an effect on a signal current flowing on the power lines may be inhibited.

Figure 6:
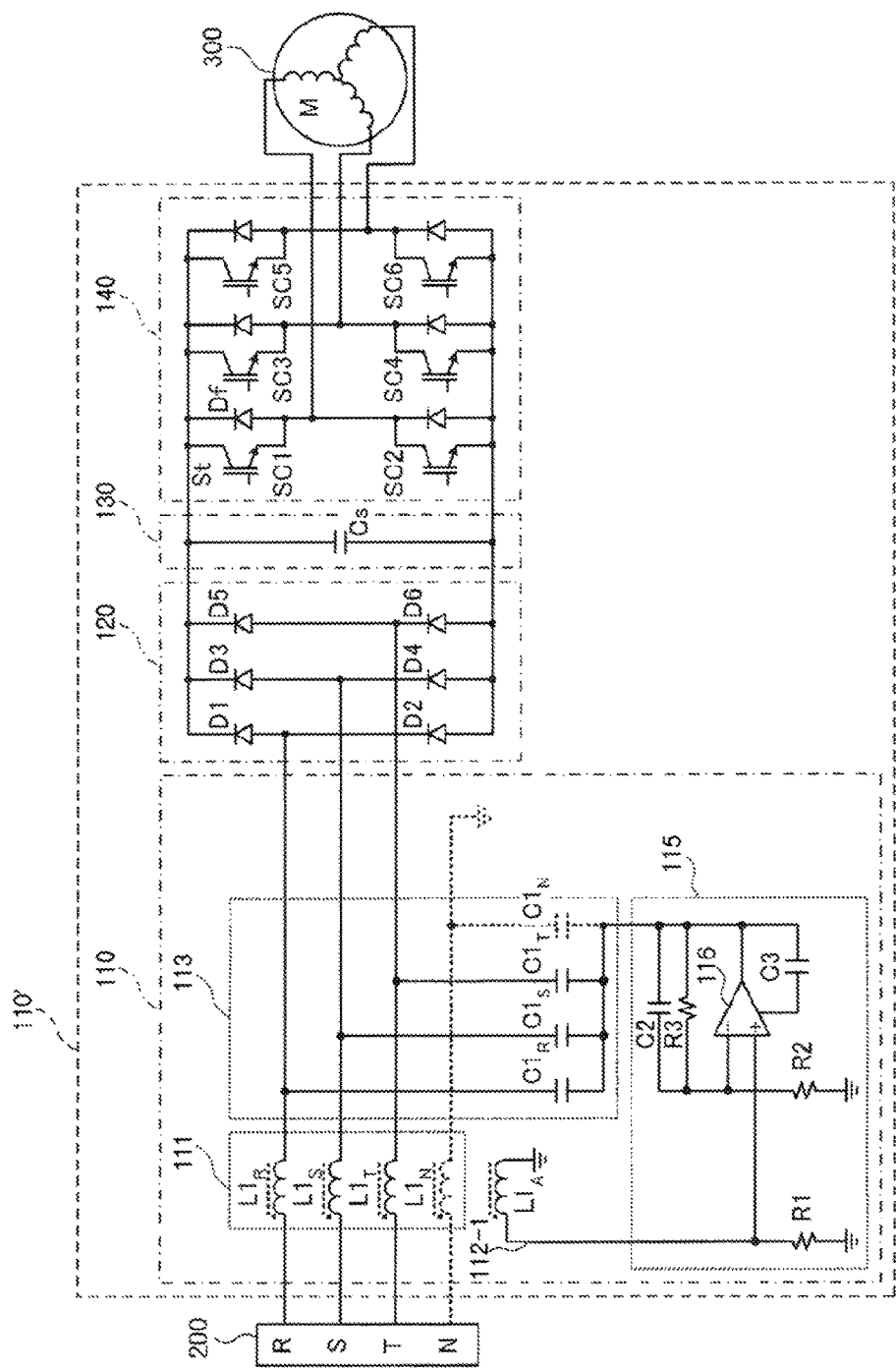
FIG. 6 is a circuit diagram of the inverting device of FIG. 4 from which a second coil part is excluded.

FIG. 6 is a circuit diagram of an inverting device 100' that excludes the second coil part 114, unlike the inverting device 100-1 of FIG. 4.

Referring to FIG. 6, the inverting device 100' excludes the second coil part 114 included in the inverting device 100-1 of FIG. 4. Also, the inverting device 100' does not include a power line of an N phase. Therefore, the power line or the like of the N phase is marked with a broken line. In other words, an AC is supplied to the inverting device 100' through the AC power source 200 having a three-phase three-wire system. The other elements of the inverting device 100' are the same as those of the inverting device 100-1 of FIG. 4 according to the previous exemplary embodiment, and thus their description are omitted.

Figure 7A:
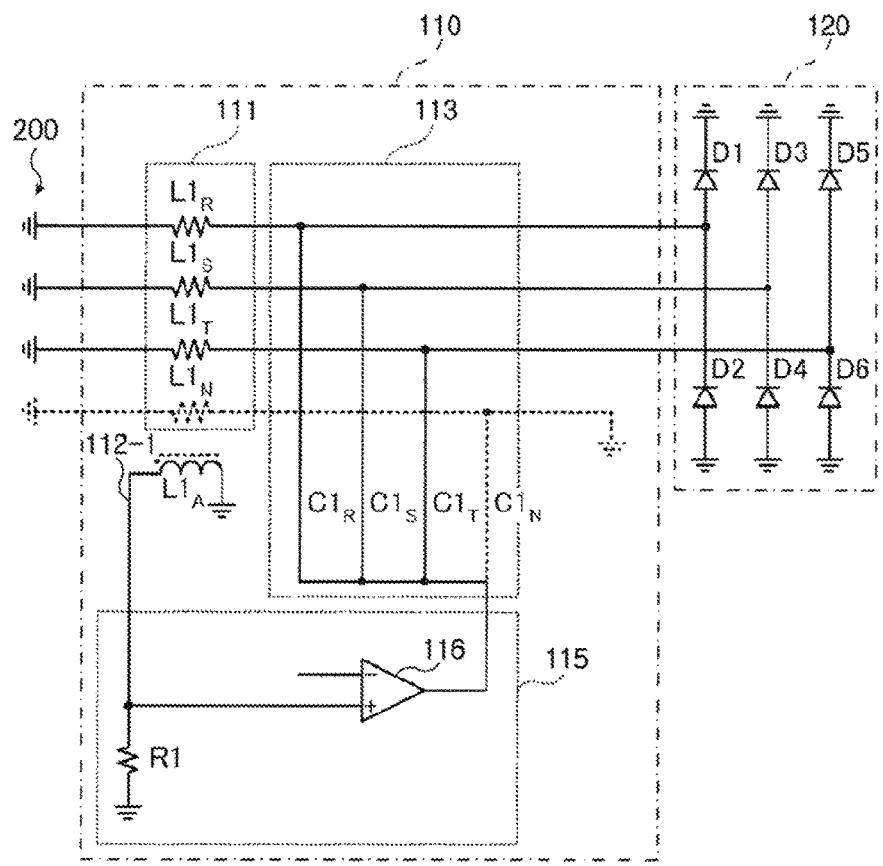
FIGS. 7A and 7B are equivalent circuit diagrams of an inhibitor and a rectifier of the inverting device of FIG. 6 that operates in a frequency band of noise that is to be inhibited.
Figure 7B:
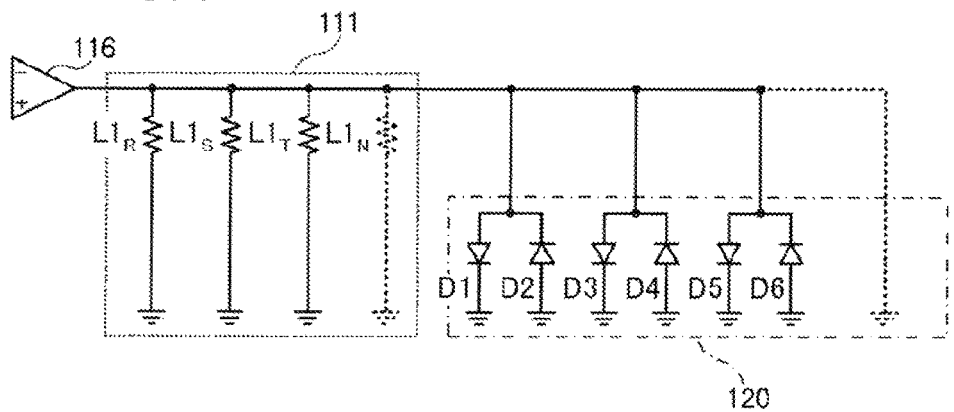

FIGS. 7A and 7B are equivalent circuit diagrams of the inhibitor 110 and the rectifier 120 of the inverting device 100' of FIG. 6 that operates in a frequency band of noise to be inhibited. FIG. 7A illustrates an AC equivalent circuit corresponding to FIG. 6. FIG. 7B illustrates an AC equivalent circuit seen from the output node of the operational amplifier 116 of the amplifier 115.

As described with reference to FIGS. 5A and 5B, the coil L1 alternatingly functions as a resistor, and the capacitor C1 alternatingly short-circuits. Also, the R, S, T, and N phases of the AC power source 200 alternatingly short-circuit. Also, the rectification diode D of the rectifier 120 alternatingly short-circuits.

The non-inverting input node "+" of the operational amplifier 116 of the amplifier 115 is the same as the non-inverting input node "+" of the operational amplifier 116 of the inverting device 100-1 shown in FIGS. 4 and 5A. In other words, an impedance of the non-inverting input node "+" of the operational amplifier 116 is high. Therefore, a voltage corresponding to a common mode current detected from the first coil part 111 becomes higher and becomes easy to be input into the operational amplifier 116 of the amplifier 115.

As described with reference to FIG. 5B, the output node of the operational amplifier 116 of the amplifier 115 is grounded through the rectification diodes D1 through D6 of the rectifier 120. Here, the rectification diodes D1 through D6 are connected to one another in a direction toward which a current flows with respect to ground. Therefore, according to whether a voltage output from the output node of the operational amplifier 116 is plus or minus, the output node of the operational amplifier 116 is grounded forward from one of the rectification diodes D1 through D6.

For example, in a case of silicon diode, a forward voltage is low, and although a current of 30 A flows, a voltage is about 1.5 V.

In other words, if a current for removing the common mode current is to be supplied through the capacitor 113, a high current needs to be supplied at a low voltage. However, the operational amplifier 116 that is widely used is difficult to supply a current of 30 A at a voltage of 1.5 V.

If a power line of the N phase exists, the output node of the operational amplifier 116 is grounded as marked with a dotted line in FIG. 7B. Therefore, the inverting device 110 to which the previous exemplary embodiment is not applied may not use the power line of the N phase.

As described above, in the inverting device 100-1 of FIG. 4 according to the previous exemplary embodiment, the inhibitor 110 includes the first coil part 111 and the second coil part 114. Therefore, an impedance seen at the input node (i.e., the non-inverting input node "+") of the operational amplifier 116 is high. Due to this, it is easy to follow fluctuations in the detected common mode current. Therefore, the common mode noise may be precisely inhibited. Also, an impedance seen at the output node of the operational amplifier 116 is high. According to this characteristic, although a product has high specifications, the product may use the general operational amplifier 116.

In other words, conduction noise including common mode noise may be easily inhibited.

Figure 8:
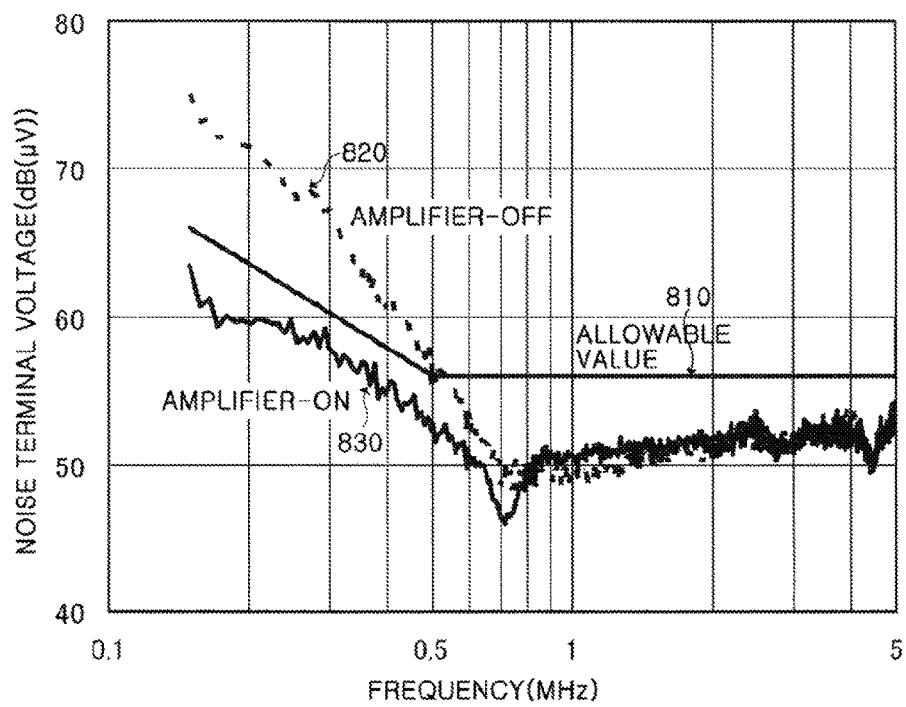
FIG. 8 is a graph illustrating an effect of an inhibitor of an inverting device that inhibits common mode noise, according to an exemplary embodiment of the present invention.

FIG. 8 is a graph illustrating an effect of inhibiting common mode noise by using the inhibitor 110 of the inverting device 100-1 of the previous exemplary embodiment.

Referring to FIG. 8, a vertical axis denotes a noise terminal voltage dB (μV) that is a voltage drop of both ends of a resistor for measuring noise of a Line Impedance Stabilization Network (LISN). A horizontal axis denotes a frequency MHz. Also, the graph of FIG. 8 also illustrates an allowable value 810 that is set by CISPR.

In the inverting device 100-1 according to the previous exemplary embodiment, the amplifier 115 operates if drive power driving the operational amplifier 116 is supplied (or turned on) but does not operate if the drive power is not supplied (or turned off). The graph of FIG. 8 illustrates a turn-on status (amplifier-on 830) and a turn-off status (amplifier-off 820) of the operational amplifier 116.

On the amplifier-on 830, the operational amplifier 116 operate, and the common mode current sensed by the coil L1A is amplified. Therefore, a current that removes the common mode current is supplied to (or overlaps with) the power lines of the R, S, T, and N phases from the capacitor 113. In other words, on the amplifier-on 830, the inhibitor 110 operates.

On the amplifier-off 820, the operational amplifier 116 does not operate, and the common mode current sensed by the coil L1A is not amplified. Therefore, the current that removes the common mode current is not supplied to (or does not overlap with) the power lines of the R, S, T, and N phases from the capacitor 113. In other words, on the amplifier-off 820, the inhibitor 110 does not operate.

In comparison between the amplifier-one 830 and the amplifier-off 820, the noise terminal voltage exceeds an allowable value in a frequency band of 0.5 MHz or less on the amplifier-off 820. However, on the amplifier-on 830, the noise terminal voltage is lower than the allowable value.

In the inverting device 100-1 according to the previous exemplary embodiment, the inhibitor 110 sufficiently inhibits common mode noise, i.e., conduction noise.

The inverting device 100-1 according to the previous exemplary embodiment inhibits conduction noise flowing on the power line of the N phase.

Also, if the operational amplifier 116 of the amplifier 115 of the inhibitor 110 is realized as a current amplifier, the current that removes (or offsets) the common mode current may be easily controlled.

In the inverting device 100-1 according to the previous exemplary embodiment described above, the detection coil L1A 112-1 is magnetically coupled to the first coil part 111. However, even if the detection coil L1A 112-1 is magnetically coupled to the second coil part 114, the detection coil L1A 112-1 equally operates.

The inverting device 100-1 of FIG. 4 according to the previous exemplary embodiment is supplied with an AC from the AC power source 200 having the three-phase three-wire system. An inverting device 100-2 according to another exemplary embodiment is supplied with an AC from the AC power source 200 having the three-phase three-wire system.

Figure 9:
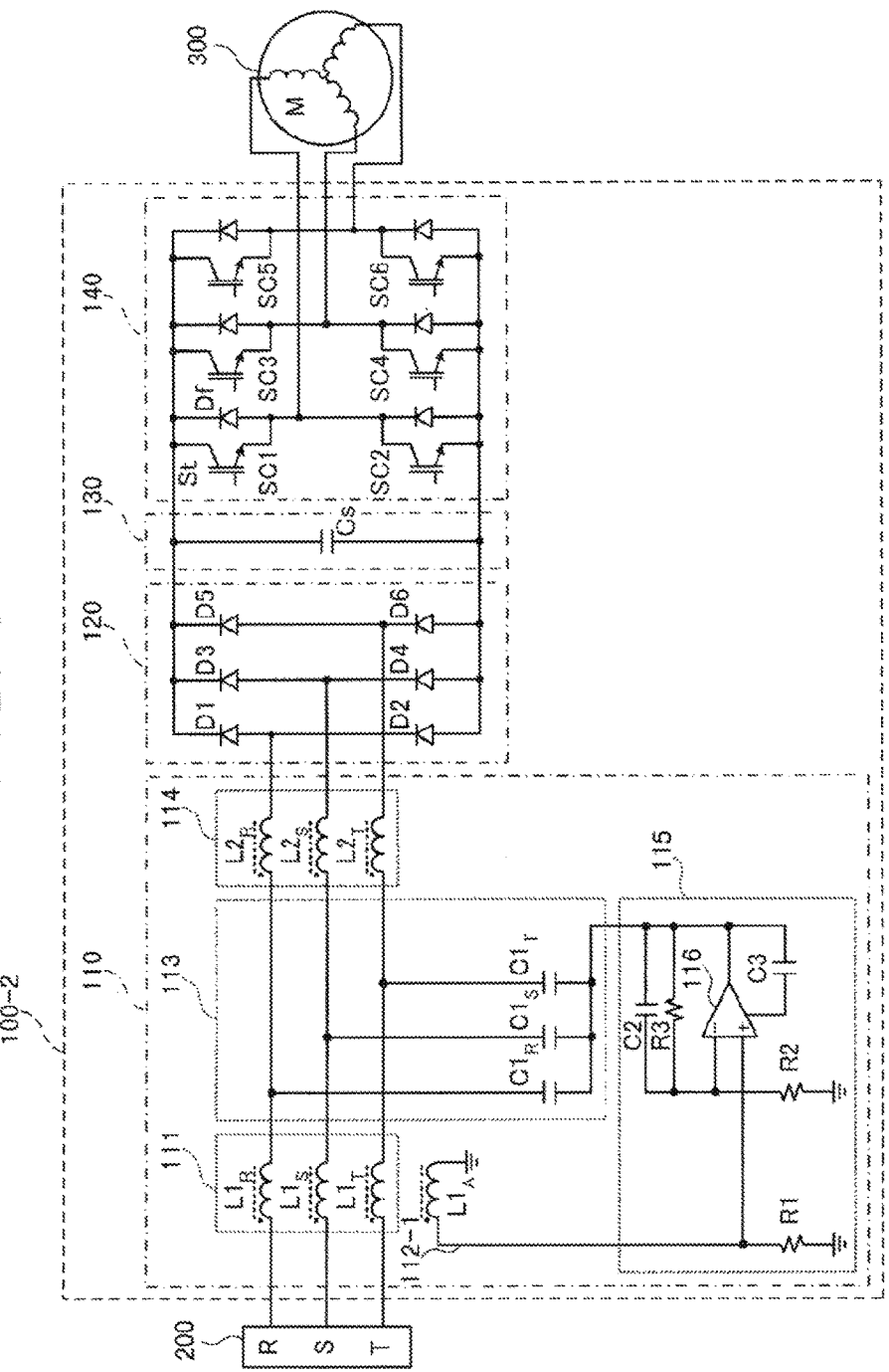
FIG. 9 is a circuit diagram of an inverting device according to another exemplary embodiment of the present invention.

FIG. 9 is a circuit diagram of the inverting device 100-2 according to another exemplary embodiment of the present invention.

Referring to FIG. 9, the inverting device 100-2 of the present exemplary embodiment does not include a power line of an N phase, unlike the inverting device 100-1 of FIG. 4. In other words, the inverting device 100-2 includes a power line corresponding to an AC power source 200 having a three-phase three-wire system. The other elements of the inverting device 100-2 are the same as those of the inverting device 100-1 of FIG. 4 and thus are denoted by the same reference numerals, and their repeated descriptions are omitted.

As described in the previous exemplary embodiment, the inverting device 100-2 using the AC power source 200 having the three-phase three-wire system also inhibits conduction noise by using the inhibitor 110.

The inverting device 100-1 of FIG. 4 and the inverting device 100-2 of FIG. 9 are supplied with an AC from a three-phase AC power source 200. However, an inverting device 100-3 according to another exemplary embodiment is supplied with an AC from an AC power source 200 having a single-phase two-wire system.

Figure 10:
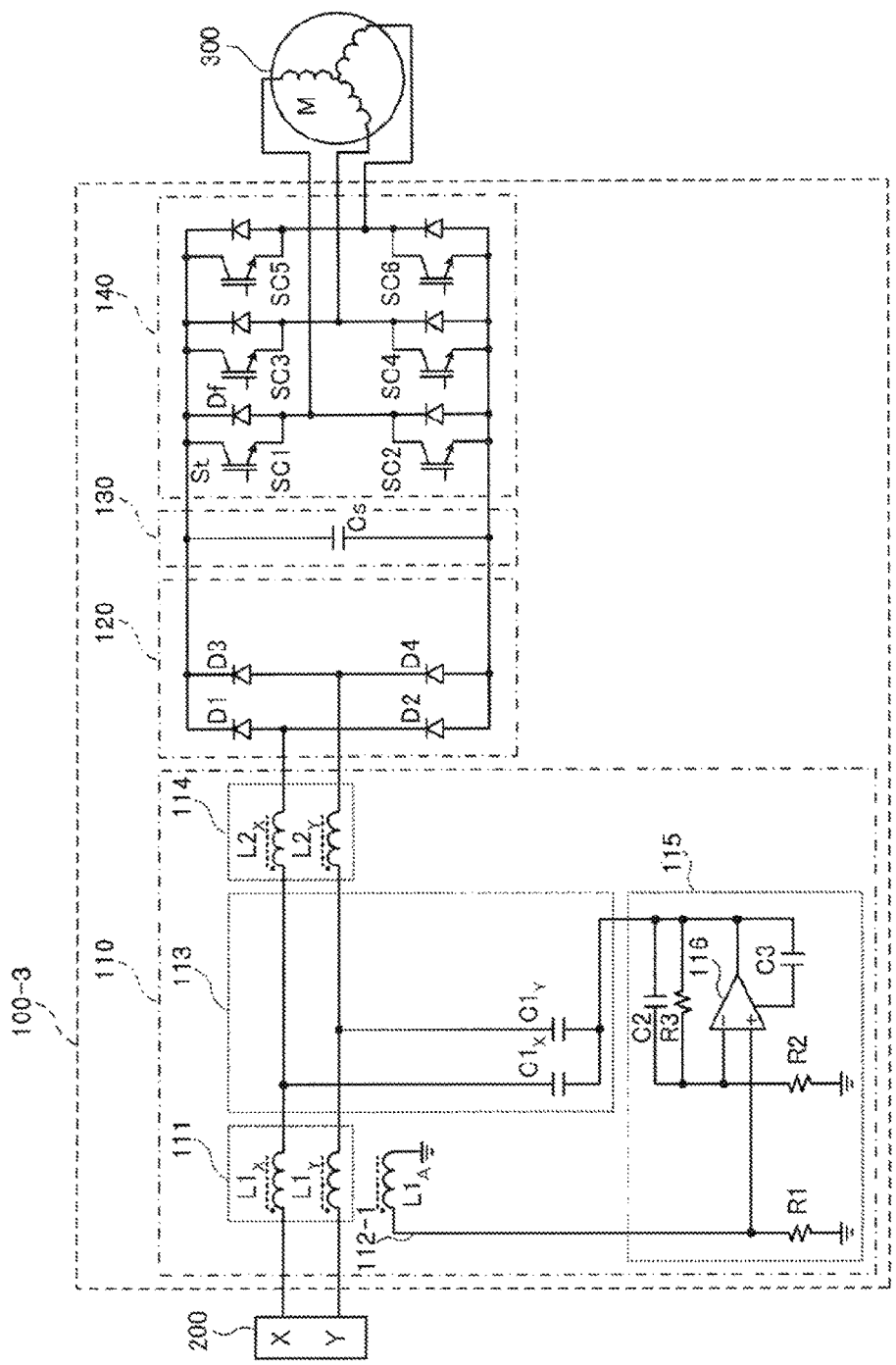
FIG. 10 is a circuit diagram of an inverting device according to another exemplary embodiment of the present invention.

FIG. 10 is a circuit diagram of the inverting device 100-3 according to another exemplary embodiment.

Referring to FIG. 10, the inverting device 100-3 according to the present exemplary embodiment replaces R and S phases with X and Y phases and is not supplied with ACs of T and N phases, unlike the inverting device 100-1 of FIG. 4. Also, the rectifier 120 includes four rectification diodes D1 through D4. In other words, the inverting device 100-3 includes a power line corresponding to the AC power source 200 having the single-phase two-wire system. The other elements of the inverting device 100-3 are the same as those of the inverting device 100-1 of FIG. 4 and thus are denoted by the same reference numerals, and their detailed descriptions are omitted.

Like the inverting device 100-1 of FIG. 4, the inverting device 100-3 using the AC power source 200 having the single-phase two-wire system also inhibits conduction noise by using the inhibitor 110.

The inverting device 100-1 of FIG. 4 includes the detection coil L1A 112-1 that is magnetically coupled to the first coil part 111. However, an inverting device 100-4 according to another exemplary embodiment further includes a second detection coil L2A 112-2 that is magnetically coupled to the second coil part 114 of the inhibitor 110. The second detection coil L2A 112-2 detects a common mode current.

Figure 11:
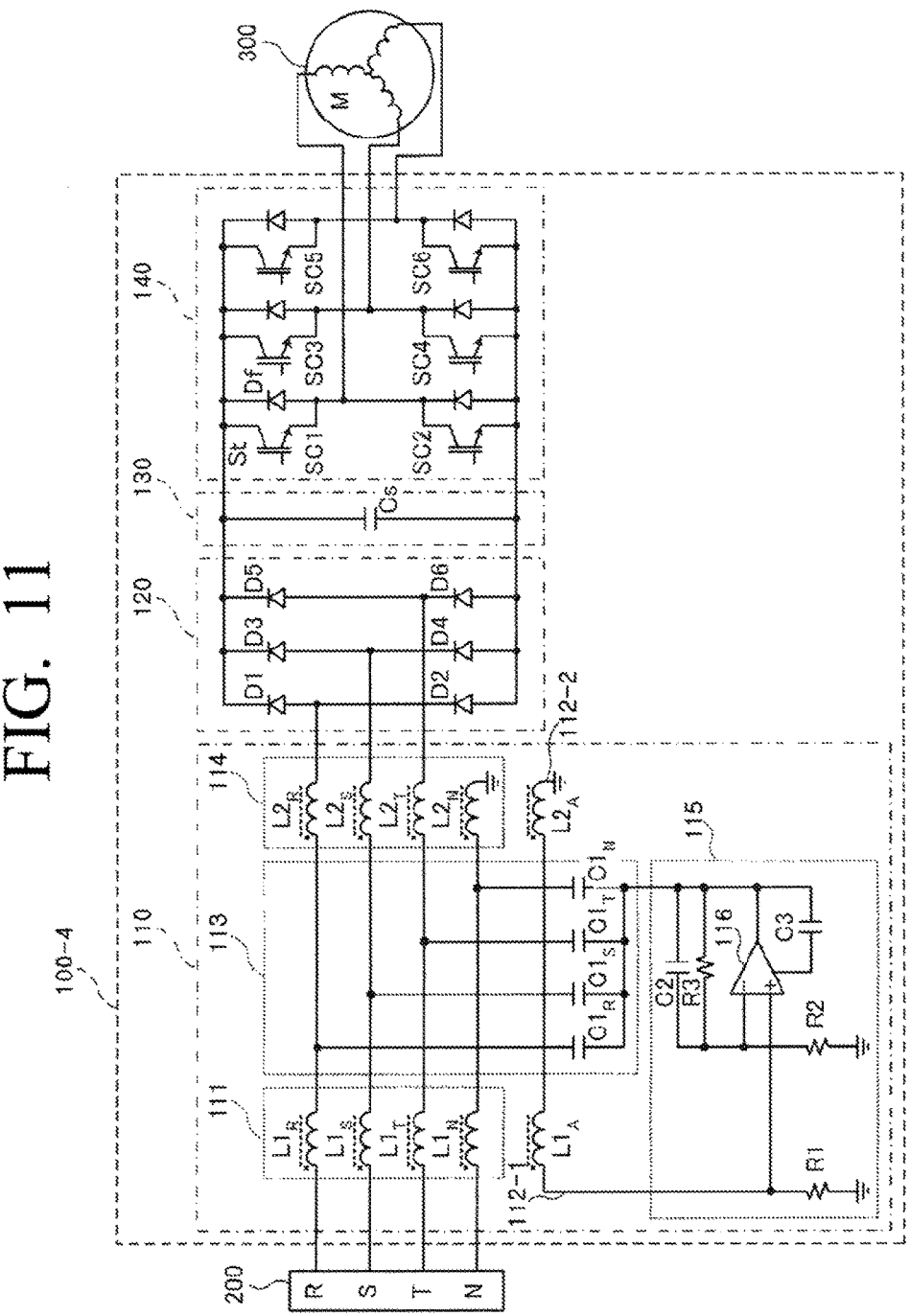
FIG. 11 is a circuit diagram of an inverting device according to another exemplary embodiment of the present invention.

FIG. 11 is a circuit diagram of the inverting device 100-4 according to another exemplary embodiment of the present invention.

Referring to FIG. 11, the inverting device 100-4 further includes the second detection coil L2A 112-2 that detects the common mode current from the second coil part 114. Also, a terminal of the first detection coil L1A 112-1 is not grounded and is connected to a terminal of the second detection coil L2A 112-2. An other terminal of the second detection coil L2A 112-2 is grounded.

The other elements of the inverting device 100-4 are the same as those of the inverting device 100-1 of FIG. 4 and thus are denoted by the same reference numerals, and their repeated descriptions are omitted.

As described above, a plurality of detection coils L1A 112-1 and L2A 112-2 may form a larger impedance and output a larger sensing signal of a common mode current. Therefore, the detector 112 may further well follow changes in the common mode current and more precisely inhibit common mode noise.

For example, the coil L1R of the first coil part 111 and the coil L2R of the second coil part 114 may be formed of a conducting wire (or a wire) that is wound on one core and has a tap. In this case, an end of the conducting wire (or the wire) is connected to a power line of an R phase of the AC power source 200, and an other end of the conducting wire (or the wire) is connected to a power line of an R phase of a load (a downflow including the rectifier 120). Also, a capacitor C1R is connected to the tap. Other coils L1S, L1T, and L1N and coils L2S, L2T, and L2$n$ are equally constituted. Also, conducting wires (or wires) of the first detection coil L1A 112-1 and the second detection coil L2A 112-2 may also be wound on one core.

Therefore, the first coil part 111 and the second coil part 114 may be constituted as one member.

As another example, the coils L1R, L1S, L1T, and L1N and the detection coil L1A 112-1 may be wound on one core, and the coils L2R, L2S, L2T, and L2N and the detection coil L2A 112-2 may be wound on another core. Therefore, a part into which the first coil part 111 and the detection coil L1A 112-1 are combined may be the same as a part into which the second coil part 114 and the detection coil L2A 112-2 are combined. Therefore, the parts may be easily manufactured and managed.

Also, the detection coil L2A 112-2 may be further included in the inverting device 100-2 or 100-3 according to the previous exemplary embodiment so as to enable the detection coil L2A 112-2 to be magnetically coupled to the second coil part 114 of the inhibitor 110.

In the inverting device 100 according to the exemplary embodiments, the inhibitor 110 is disposed between the AC power source 200 and the rectifier 120 but is not limited thereto. The inhibitor 110 may be disposed between the inverter 140 and the motor 300 that is the load of the inverting device 100. In other words, the inhibitor 110 may be disposed on a power line that supplies an AC.

For example, the inverting devices 100-1, 100-2, 100-3, and 100-4 according to the exemplary embodiments described above may further include electronic members (e.g., resistors, capacitors, coils, or the like) or circuits besides the above-described elements.

In the exemplary embodiments described above, the inhibitor 110 has been described as inhibiting conduction noise of the inverting device 100 but is not limited thereto. The inhibitor 110 that inhibits the conduction noise may be applied to any device that generates conduction noise, besides the inverting device 100.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An inverting apparatus for converting AC power into rectification power for driving a motor, the inverting apparatus comprising:
   a first coil part configured to be connected with alternating current (AC) power;
   a second coil part configured to be connected with the first coil part;

a first inductor configured to be coupled to the first coil part and detect a first common mode current flowing on the first coil part; and a second inductor configured to be coupled to the second coil part and detect a second common mode current flowing on the second coil part;

an amplifier configured to amplify a current received from the first inductor and the second inductor; and a capacitor configured to receive the amplified current from the amplifier and supply offset power corresponding to the amplified current to a connection terminal to which the first coil part and the second coil part are connected for offsetting the detected first common mode current and the second common mode current.

2. The inverting apparatus of claim 1, wherein a first coil of the first coil part and a second coil of the second coil part are wound on a core.

3. The inverting apparatus of claim 1, wherein the first coil part comprises a plurality of first coils configured to be individually supplied with phases of the AC power.

4. The inverting apparatus of claim 3, wherein the second coil part comprises a plurality of second coils configured to be respectively connected to the plurality of first coils in series.

5. The inverting apparatus of claim 1, wherein the amplifier is a current amplifier.

6. The inverting apparatus of claim 1, wherein the first inductor is configured to detect the common mode current through an induced current derived from a current flowing through the first coil part.

7. A conduction noise filtering circuit comprising:

a first coil part configured to be connected with alternating current (AC) power;

a second coil part configured to be connected with the first coil part;

a first inductor configured to be magnetically coupled to the first coil part and detect a first common mode current flowing on the first coil part;

a second inductor configured to be magnetically coupled to the second coil part and detect a second common mode current flowing on the second coil part;

an amplifier configured to amplify a current received from the first inductor and the second inductor; and a capacitor configured to receive the amplified current from the amplifier and supply offset power corresponding to the amplified current to a connection terminal to which the first coil part and the second coil part are connected for offsetting the detected first common mode current and the second common mode current.

8. The conduction noise filtering circuit of claim 7, wherein a first coil of the first coil part and a second coil of the second coil part are wound on a core.

9. The conduction noise filtering circuit of claim 7, wherein the first coil part comprises a plurality of first coils configured to be individually supplied with phases of the AC power.

10. The conduction noise filtering circuit of claim 9, wherein the second coil part comprises a plurality of second coils configured to be respectively connected to the plurality of first coils in series.

11. The conduction noise filtering circuit of claim 7, wherein the amplifier is a current amplifier.

12. The conduction noise filtering circuit of claim 7, wherein the first inductor is configured to detect the common mode current through an induced current derived from a current flowing through the first coil part.

* * * * *